US012710982B1

(12) United States Patent
Saginhor et al.

(10) Patent No.: US 12,710,982 B1
(45) Date of Patent: Aug. 18, 2026

(54) OPTIMIZATION TOOL FOR AGENTIC FLOWS

(71) Applicant: Intuit Inc., Mountain View, CA (US)

(72) Inventors: Nitzan Gado Saginhor, Hod Hasharon (IL); Shirli Di-Castro Shashua, Kfar Saba (IL); Hadas Baumer, Petah Tikva (IL); Shon Mendelson, Tel Aviv (IL); Kfir Aharon, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/314,755

(22) Filed: Aug. 29, 2025

(51) Int. Cl.
*G06F 9/48* (2006.01)

(52) U.S. Cl.
CPC .................................. *G06F 9/4881* (2013.01)

(58) Field of Classification Search
CPC ..................................................... G06F 9/4881
See application file for complete search history.

(56) References Cited

U.S. PATENT DOCUMENTS 12,293,272 B1 * 5/2025 Poulis .................... G06N 20/00
2021/0019665 A1 * 1/2021 Gur ........................ G06N 20/20
2021/0286989 A1 * 9/2021 Zhong .................... G06N 20/20
2022/0036123 A1 * 2/2022 Cummings ........... G06F 18/285
2025/0061307 A1 * 2/2025 Tran ....................... G06N 3/045
2025/0272149 A1 * 8/2025 Eleti ..................... G06F 9/5027

* cited by examiner

*Primary Examiner* — Michael W Ayers

(74) *Attorney, Agent, or Firm* — Lathrop GPM LLP

(57) ABSTRACT

A method includes obtaining an agentic workflow from an artificial intelligence (AI) agent execution framework. An execution graph of the agentic workflow is generated by an LLM, including a multitude of nodes corresponding to a multitude of tasks. The tasks are partitioned by complexity into first complexity level tasks and second complexity level tasks. A first set of candidate models performs the first complexity level tasks. A first candidate model is assigned to a first task, based on an optimization function value of performance metrics of the first candidate model. A second set of candidate models performs the second complexity level tasks. A second candidate model is further assigned to a second task. The candidate models are assigned to respective nodes of the execution graph, to modify the execution graph. An updated agentic workflow is generated from the modified execution graph and deployed to the AI agent execution framework.

16 Claims, 6 Drawing Sheets

OPTIMIZATION TOOL FOR AGENTIC FLOWS

BACKGROUND

Enterprise applications and software services are increasingly becoming artificial intelligence (AI)-powered software products. AI-powered applications may include autonomous assistants, multi-modal search and reasoning engines, implemented as agentic workflows. AI-powered software products may be designed to use agentic workflows. Agentic workflows use language models to drive complex, multi-step reasoning and action flows. Agentic workflows rely on chaining multiple calls to large language models (LLMs) to simulate deliberation, planning and execution.

Each LLM call may consume time and computational resources, leading to higher latency and cost in generating responses. As AI-powered software products scale in complexity, managing the efficiency and performance of agentic flows becomes a challenge.

SUMMARY

In general, in one aspect, one or more embodiments relate to a method. The method includes obtaining an agentic workflow from an artificial intelligence (AI) agent execution framework. The method further includes generating an execution graph for the agentic workflow by an LLM. The execution graph includes a multitude of nodes corresponding to a multitude of tasks. The method further includes partitioning the multitude of tasks by complexity to generate a set of first complexity level tasks and a set of second complexity level tasks. The method further includes executing a first set of candidate models to perform the set of first complexity level tasks. A first candidate model is assigned as a first candidate model to a first task of the set of first complexity level tasks, based on an optimization function value of performance metrics of the first candidate model. The method further includes executing a second set of candidate models to perform the set of second complexity level tasks. A second candidate model is further assigned to a second task of the set of second complexity level tasks, based on an optimization function value of performance metrics of the second candidate model. The method further includes assigning a first node corresponding to the first task to the first candidate model, and a second node corresponding to the second task to the second candidate model in the execution graph by the LLM, to generate a modified execution graph. The method further includes deploying an updated agentic workflow generated from the modified execution graph to the AI agent execution framework.

In general, in one aspect, one or more embodiments relate to a system. The system includes at least one computer processor, and an AI agent execution framework, executing on the at least one computer processor. The system further includes an optimization tool, executing on the at least one computer processor. The optimization tool is configured for obtaining an agentic workflow from the AI agent execution framework. The optimization tool is further configured for causing an LLM to generate an execution graph for the agentic workflow. The execution graph includes a multitude of nodes, corresponding to a multitude of tasks. The optimization tool is further configured for partitioning the multitude of tasks by complexity, to generate a set of first complexity level tasks and a set of second complexity level tasks. The optimization tool is further configured for executing a first set of candidate models to perform the set of first complexity level tasks. A first candidate model is assigned as a first candidate model to a first task of the set of first complexity level tasks, based on an optimization function value of performance metrics of the first candidate model. The optimization tool is further configured for executing a second set of candidate models to perform the set of second complexity level tasks. A second candidate model is further assigned to a second task of the set of second complexity level tasks, based on an optimization function value of performance metrics of the second candidate model. The optimization tool is further configured for assigning a first node corresponding to the first task to the first candidate model, and a second node corresponding to the second task to the second candidate model in the execution graph by the LLM, to generate a modified execution graph. The optimization tool is further configured for deploying an updated agentic workflow generated from the modified execution graph to the AI agent execution framework.

In general, in one aspect, one or more embodiments relate to a method. The method includes generating an execution graph of an agentic workflow by an LLM. The execution graph includes a multitude of nodes corresponding to a multitude of tasks. The method further includes partitioning the multitude of tasks by complexity to generate a set of first complexity level tasks and a set of second complexity level tasks. The method further includes executing, by each candidate model of a first set of candidate models, the set of first complexity level tasks to obtain a first multitude of sets of performance metrics. Each set of performance metrics of the first multitude of sets of performance metrics is generated by a corresponding candidate model of the first set of candidate models. The method further includes selecting, for a first task of the first complexity level tasks, a first multitude of corresponding performance metrics from the first multitude of sets of performance metrics. The method further includes applying a first optimization function to the corresponding performance metrics to obtain a first multitude of corresponding optimization function values. The method further includes selecting a first performance metric from the corresponding performance metrics based on a first corresponding optimization function value satisfying a minimum accuracy threshold. The method further includes assigning a first candidate model from the first set of candidate models that generated the performance metric. The method further includes executing by each candidate model of a second set of candidate models, the set of second complexity level tasks to obtain a second multitude of sets of performance metrics, wherein each set of performance metrics of the second multitude of sets of performance metrics is generated by the corresponding candidate model of the second set of candidate models. The method further includes selecting, for a second task of the set of second complexity level tasks, a second multitude of corresponding performance metrics from the second multitude of sets of performance metrics. The method further includes applying a second optimization function to the second multitude of corresponding performance metrics to obtain a second multitude of corresponding optimization function values. The method further includes selecting a second performance metric from the second multitude of corresponding performance metrics based on a second corresponding optimization function value satisfying the minimum accuracy threshold. The method further includes assigning a second candidate model from the second set of candidate models that generated the performance metric. The method further includes assigning, by the LLM, a first node corresponding to the first task to the first candidate model, and a second node corresponding to the second task to the second candidate model in the execution graph, to generate a modified execution graph. The method further includes deploying an updated agentic workflow generated from the modified execution graph to an AI agent execution framework.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to a process by which an agentic workflow of an AI-powered application and/or software service is optimized and updated. Specifically, an LLM is used to represent an agentic workflow through the execution graph. Then, the large or small LLMS are assigned to nodes of the execution graph to modify the execution graph. From the modified execution graph, the agentic workflow is updated. The assignment may be based on the optimization function applied to performance metrics of the LLMs performing the complex or simple tasks.

An embodiment of the invention is an optimization tool. The optimization tool models an agentic workflow of a software product as an execution graph. The execution graph encodes the dynamic reasoning process of the agentic workflow and the tasks of the agentic workflow. The tasks of the agentic workflow are partitioned, by complexity, into tasks classified as simple tasks and complex tasks. Smaller, lightweight large language models (LLMs) may be assigned to the simple tasks, and larger, expert-level LLMs may be assigned to the complex tasks. The LLMs are triggered, or executed to perform the tasks, and performance metrics of the LLMs in performing the tasks are calibrated. The performance metrics may include a cost of the LLM calls in performing a task, the latency of the LLM in generating a response and accuracy of the response with respect to the semantic intent of the task.

To further refine the efficiency and responsiveness of the agentic workflow, an optimization function is used to evaluate the performance of the assigned LLMs with respect to the tasks of the agentic workflow. The optimization function uses performance metrics of the assigned LLMs to determine corresponding optimization function values. The optimization tool uses the optimization function values to select a combination of LLM assignments across the execution graph.

Figure 1:
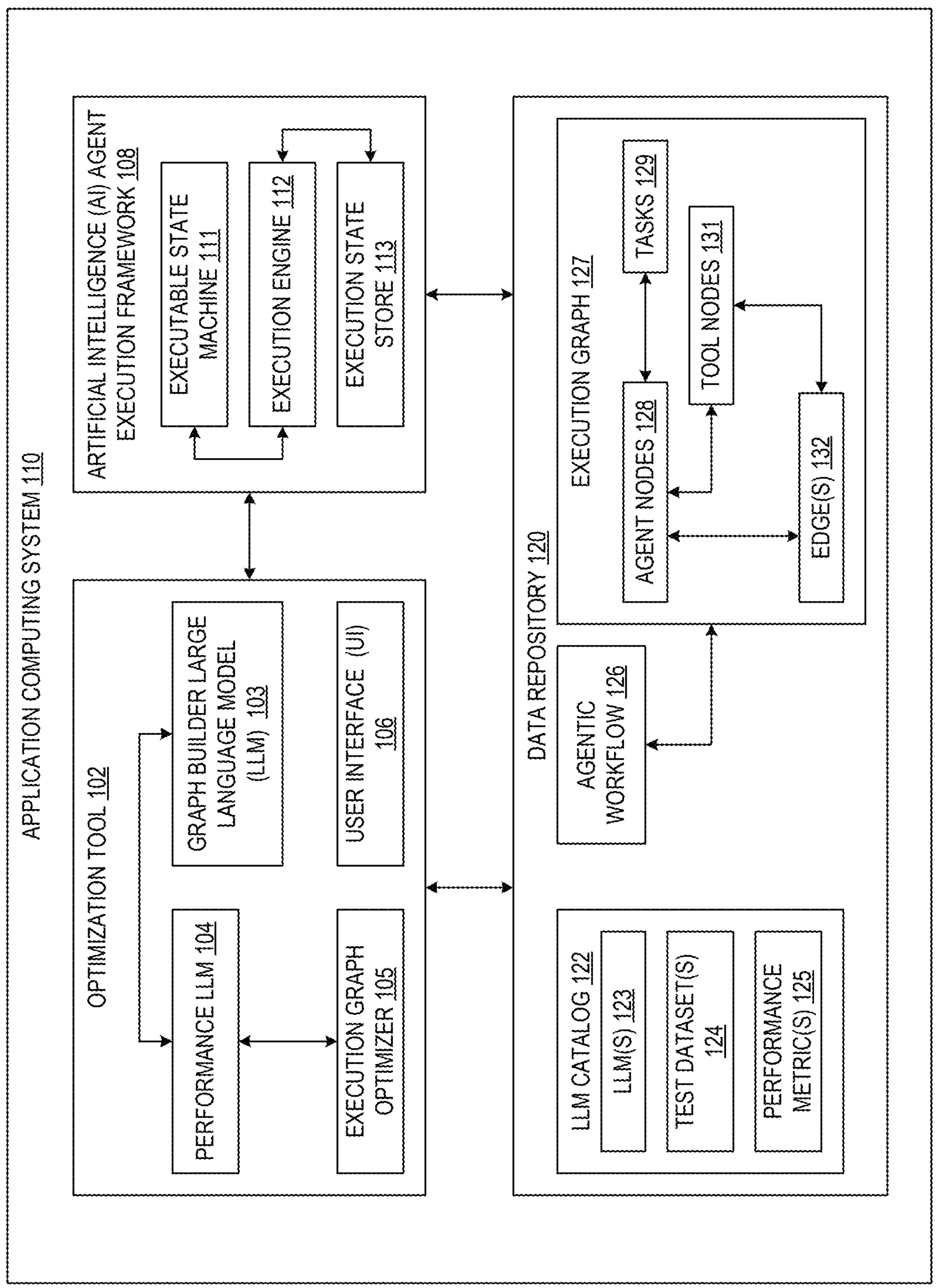
FIG. 1 shows a computing system, in accordance with one or more embodiments.

Attention is now turned to the figures. FIG. 1 shows a computing system, in accordance with one or more embodiments. Attention is now turned to the figures. FIG. 1 shows a computing system, in accordance with one or more embodiments. The system shown in FIG. 1 may include an application computing system (110). The application computing system (110) is one or more computer processors, data repositories, communication devices, and supporting hardware and software. The application computing system (110) may be in a distributed computing environment. The application computing system (110) includes a computer processor. The computer processor is one or more hardware or virtual processors which may execute computer readable program code that defines one or more applications, such as the optimization tool (102), and the artificial intelligence (AI) agent execution framework (108). An example of the computer processor is described with respect to the computer processor(s) (602) of FIG. 6A. Thus, the application computing system (110) is configured to execute one or more applications, such as the optimization tool (102), and the AI agent execution framework (108). An example of a computer system and network that may form the application computing system (110) is described with respect to FIG. 6A and FIG. 6B.

The system shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or physical storage devices.

The data repository (120) includes an agentic workflow (126). An agentic workflow is a multi-step computational process. Each step of the process may be executed by an artificial intelligence (AI) agent, that uses an LLM as its core computational engine, or by a software tool. The agentic workflow may be structured as a graph-based execution plan. In the graph-based execution plan, discrete tasks, decision points, or software tool invocations may be represented, or instantiated as nodes. The transitions between the nodes may be represented as edges. The agentic workflow may further include metadata that describes the configuration, dependencies, and execution logic of each node. The agentic workflow (126) in the data repository (120) may be obtained as a serialized representation derived from a programmatic definition, implemented, for example, using the LANGGRAPH® framework. (LANGGRAPH® is a registered trademark of LangChain Inc., a Delaware corporation). In the LANGGRAPH® framework, nodes and edges may be instantiated in code and the relationships of nodes and edges may be constructed by configuring flow control mechanisms such as loops, retries, and conditional branches. Thus, the agentic workflow (126) may be a serialized representation capturing the full structure and behavior of the agentic system in a format suitable for analysis, optimization, and deployment.

In one or more embodiments, software developers may develop an enterprise application or services suite that operates as an agentic workflow. The application or services suite may be deployed within an agentic execution framework, which supports modular, graph-based orchestration of LLMs and tools, e.g., LANGGRAPH®. The optimization tool may obtain the serialized representation of the agentic workflow. The serialized representation of the agentic workflow may be a Javascript Object Notation (JSON) document or a serialized Python object graph.

The data repository further includes an execution graph (127). The execution graph is a Markovian graph representation of the agentic workflow. The execution graph (127) is an abstraction of the agentic workflow into a probabilistic model. The Markovian graph embodied by the execution graph (127), includes one or more agent nodes (128) and one or more tool nodes (131). The agent nodes (128) represent AI agents of the agentic workflow that may perform task(s) (129). In the agentic workflow, an AI agent may invoke external tools, which are independent software programs, or components, to perform at least a portion of the task. The external tools are represented by the tool nodes (131) in the execution graph (127).

For example, in an agentic workflow, an AI agent may perform a task of automatically setting up a meeting by checking the schedule of the invitees and sending email to the invitees. Accordingly, the AI agent may invoke a tool to retrieve the shared calendars of the invitees. The AI agent may further determine a common time in which the invitees are available. The AI agent may further invoke another tool to send email to the invitees. The execution graph representing this agentic workflow may include an agent node connected to two tool nodes, one for retrieving the calendars, and one for sending email.

Thus, in the graph, the agent nodes (128) are associated with one or more tool nodes (131). The edges (132) interconnect the agent nodes (128) and tool nodes (131). The edges (132) enforce the execution logic of the agentic workflow, mandating that the output or result of the execution of a previous node is required prior to the execution of the next node. For example, if an agent node (128) performs a reasoning task, its output may determine which tool node (131) is subsequently invoked. The tool node may then perform another task, and the result of the tool node may serve as the input to the next agent node (128) or tool node (131). The dependency chain formed by the agent nodes (128) and tool nodes (131) interconnected by edges (132) constrains the agentic flow to operate predictably and logically. More particularly, each step of the agentic workflow is informed by the outcome of the previous step.

The data repository (120) further includes an LLM catalog (122). The LLM catalog (122) is a structured and query-able collection of metadata and associated resources that describe and organize a set of LLMs. The LLM catalog (122) functions as a registry or index for lookup, comparison, and selection of models based on relevant attributes. The LLM catalog (122) further includes a multitude of LLMs (123). The LLMs (123) are candidate models that may be assigned to agent nodes (128) in the execution graph (127). An LLM (123) entry in the LLM catalog (122) may include the identity and configuration of the LLM (e.g., name, size, capabilities, application programming interface (API) endpoints, etc). An LLM (123) may be associated with one or more test datasets (124). The test datasets may be evaluation datasets that are specific to potential tasks that the LLM may be assigned to. The test datasets (124) may be used for empirical testing and benchmarking of the LLMs (123) performing the tasks (129). The multitude of LLMs (123) may include larger, expert models, trained on tens of billions, or even 1 trillion parameters, for example, ChatGPT 5® from OpenAI®, Gemini® 1.5 Ultra from Google DeepMind®, Claude® Opus 3 from Anthropic®, LlaMA® 3 from Meta®, etc. The multitude of LLMs (123) may further include smaller, lightweight LLMs trained on 1-7 billion parameters, for example, Phi-3 Mini®, from Microsoft®, Gemma® 2 from Google DeepMind®, LLaMA® 3 (8B) from Meta®, Mistral®7B from Mistral AI©, etc.

The LLM catalog (122) further includes performance metrics (125). The performance metrics may include specific operational constraints of the LLMs, such as maximum allowable latency, computational resource limits e.g., floating point operations per second (FLOPs), memory footprint, and/or cost targets, e.g., API usage fees. The performance metrics may be derived from service agreements, vendor documentation, and performance results from performing the tasks (129). In one or more embodiments, the LLM catalog (122) may be used by the optimization tool (102) to systematically evaluate and compare LLMs for each node in the agentic workflow.

The application computing system (110) further includes an optimization tool (102). The optimization tool (102) is software or application-specific hardware, which, when executing on the computer processor, essentially performs the method of FIG. 2. The optimization tool (102) may receive a serialized representation of an agentic workflow (126). The optimization tool (102) may further generate an execution graph (127) from the agentic workflow (126). The optimization tool (102) may further optimize the execution graph (127). The optimization process may encompass evaluating the complexity of the tasks associated with each node. Further, the optimization process may include appraising candidate LLMs by executing the candidate LLMs to perform the tasks. The optimization process may further include applying a constrained optimization function to assign the most suitable LLM to each node. The optimization function may be based on performance metrics such as cost, latency, and accuracy.

The optimization tool (102) includes a graph builder LLM (103). The graph builder LLM (103) is an instance of an LLM. The graph builder LLM (103) may interpret the serialized agentic workflow (126) and generate a graph representation, namely, the execution graph (127) of the agentic workflow (126).

The optimization tool (102) further includes a performance LLM (104). The performance LLM (104) is an LLM instance that evaluates the tasks (129) of the execution graph (127) with respect to complexity. In the context of the agentic workflow (126), task complexity may refer to the computational and cognitive demands placed on a node performing a given task within the execution graph. A task may be considered complex if the task entails deeper reasoning, synthesis, decision-making, or multi-step deliberation, potentially requiring a more capable and resource-intensive LLM to perform the task effectively. Some characteristics of complex tasks may include interpretation of ambiguous input, contextual understanding, or multimodal synthesis. Complex tasks may further entail planning, evaluating multiple options, or generating structured outputs. Additionally, complex tasks may serve as decision points in the agentic workflow, where the outcome influences subsequent steps. Complex tasks may fail or produce suboptimal results if handled by lightweight or general-purpose language models. Simple tasks, by contrast, may entail routine reasoning, synthesis, and decision-making. For example, simple tasks may include basic formatting, routing, or data retrieval. Further, simple tasks may require minimal reasoning or transformation. Simple tasks may be executed reliably by smaller, faster, and cheaper LLMs or deterministic tools. Thus, the performance LLM (104) may evaluate, for each node in the execution graph, the associated task and expected reasoning depth. The classification of tasks into one of two complexity levels, namely, "complex" and "simple," may inform the assignment of LLMs to the node. Complex tasks may be matched with expert-level models, while simple tasks may be delegated to lightweight models with a goal of balancing performance, cost, and latency.

The optimization tool (102) further includes an execution graph optimizer (105). The execution graph optimizer (105) is software or application-specific hardware, which, when executed on a computer processor, applies an optimization function to the performance metrics corresponding to the LLMs in the LLM catalog (122). The performance metrics may include metrics obtained by executing the LLMs to perform the tasks (129). The LLMs may be executed in a simulation environment, or within the AI agent execution framework (108) operating in an evaluation or test mode. The execution of LLMs to perform each task may be based on information from the preceding task (e.g., a characterization of the previous step's output such as generative vs. discrete, projected accuracy of the preceding step, etc.). Thus, an LLM performing a set of tasks (129) may generate a set of performance metrics, each element of the set of performance metrics corresponding to the execution of a particular task. Accordingly, the execution graph optimizer (105) may apply the optimization function to each element of the set of performance metrics generated by a particular LLM performing a particular task. Thus, optimization function values may be generated by the execution graph optimizer (105) for a particular LLM, corresponding to the set of tasks executed by the LLM. The execution graph optimizer (105) may further determine, based on the optimization function values, an optimal LLM for performing each task.

In one or more embodiments, the optimization function may be a solution of a constrained optimization problem, e.g., minimizing total cost subject to a maximum latency threshold. The optimization function adheres to the assumption of Markovian properties, in which each task in the execution graph depends on the preceding task, and is independent of other tasks. The optimization function may solve for a requirement of a minimum accuracy (MIN_ACCURACY) needed across the entire agentic workflow. Achieving the minimum accuracy for each task ensures that the whole agentic workflow meets the target. Accordingly, with a cost factor C, latency L, and along with MAX_COST and MAX_LATENCY, the following may be the optimization function (1):

$$\mathrm{MAX}(\mathrm{LLM}_i) \rightarrow \mathrm{ACCURACY}_i - \alpha C_i - \beta L_{i\ s.t.,\ ACCURACY_i \geq MIN_{ACCURACY}}; \tag{1}$$

$C_i \leq \mathrm{MAX}_{COST}$;

$L_i \leq \mathrm{MAX}_{LATENCY}$;

$\alpha$ is the weighting factor for cost;

$\beta$ is the weighting factor for latency; and i is the number of candidate LLMs (candidate models)

The optimization tool (102) further includes a user interface (UI) (106). The UI (106) of the optimization tool is a graphical and interactive component via which users engage with the agentic workflow optimization process. The UI (106) may present a visualization of the execution graph, including its constituent nodes and edges. The visualization may further display metadata associated with each node, such as the classification of the task associated with the node (simple or complex). The visualization may further display the candidate LLMs available for assignment, and performance metrics such as projected accuracy, cost, and latency.

Through the UI (106), users may inspect the initial agentic flow as constructed by the graph builder LLM and observe how each node has been evaluated by the performance LLM. For example, users may view side-by-side comparisons of candidate models for a given node, including their estimated performance and resource consumption.

The UI (106) may also facilitate users to configure constraints and preferences that influence the optimization process. The constraints and preferences may include limiting the number of distinct LLMs used in the flow, setting maximum allowable cost or latency thresholds, or prioritizing certain nodes for high-accuracy execution. Once the optimization tool has generated a proposed configuration, the UI (106) may provide users with selection features to approve the configuration or make manual adjustments to the model assignments.

In one or more embodiments, the UI (106) may support simulation capabilities, allowing users to preview the behavior of the optimized flow under different runtime conditions or evaluation datasets. The UI (106) may also facilitate the reconstruction of the agentic flow based on the approved configuration, preparing it for deployment within the agentic execution framework. The UI (106) may be implemented as a web-based dashboard, a desktop application, or an integrated development environment (IDE) extension, and may interface directly with the underlying optimization engine and execution framework to support real-time feedback and deployment readiness.

The application computing system (110) further includes an AI agent execution framework (108). The AI agent execution framework (108) is a modular runtime system designed to execute agentic workflows using a graph-based architecture. The graph-based architecture supports stateful operation of multiple agents, and supports branching logic. The AI agent execution framework (108) further includes an executable state machine (111), an execution engine (112), and an execution state store (113). Each of these components corresponds to a distinct functional layer within the framework and collectively implements the dynamic and intelligent orchestration of tasks in an agentic workflow. An example of an AI agent execution framework is LANGGRAPH®.

The executable state machine (111) represents the compiled form of the agentic workflow. The executable state machine (111) is derived from a graph definition in which each node corresponds to a unit of computation, such as a language model invocation, a tool call, or a custom function. Transitions between nodes are defined by edges, which may be deterministic or conditional, depending on the output of the preceding node. The executable state machine (111) encodes the logic of the agentic workflow, including branching, looping, and termination conditions, and serves as the blueprint for execution.

The execution engine (112) orchestrates the traversal of the executable state machine (111). The execution engine (112) maintains a persistent state dictionary that is passed and updated across nodes as the workflow progresses. The persistent state dictionary is shown in FIG. 1 as the execution state store (113). The persistent state dictionary may include inputs, intermediate outputs, and contextual variables that influence routing decisions. The execution engine (112) may evaluate edge conditions to determine the next node or set of nodes to execute. The execution engine (112) may additionally support concurrent execution of branches when permitted by the graph structure. The execution engine (112) triggers the execution of an AI agent of an agent node to perform a task. The execution engine (112) may further orchestrate any tools at tool nodes invoked by an AI agent to perform portions of the task. Thus, the execution engine (112) triggers execution at each node in accordance with the defined logic, ensuring that the overall flow adheres to the intended behavior of the agentic system.

The execution state store (113) provides a centralized repository for tracking the evolving state of the workflow. The execution state store (113) may be implemented as an in-memory store or backed by an external system such as Redis, in accordance with persistence and scalability requirements. The execution state store (113) may further perform checkpointing by saving intermediate states for recovery, auditability, or debugging purposes. The execution state store (113) may further support observability features such as tracing and logging, which record execution paths, inputs, outputs, and errors for each node.

While FIG. 1 shows a configuration of components, other configurations may be used without departing from the scope of one or more embodiments. For example, various components may be combined to create a single component. As another example, the functionality performed by a single component may be performed by two or more components.

Figure 2:
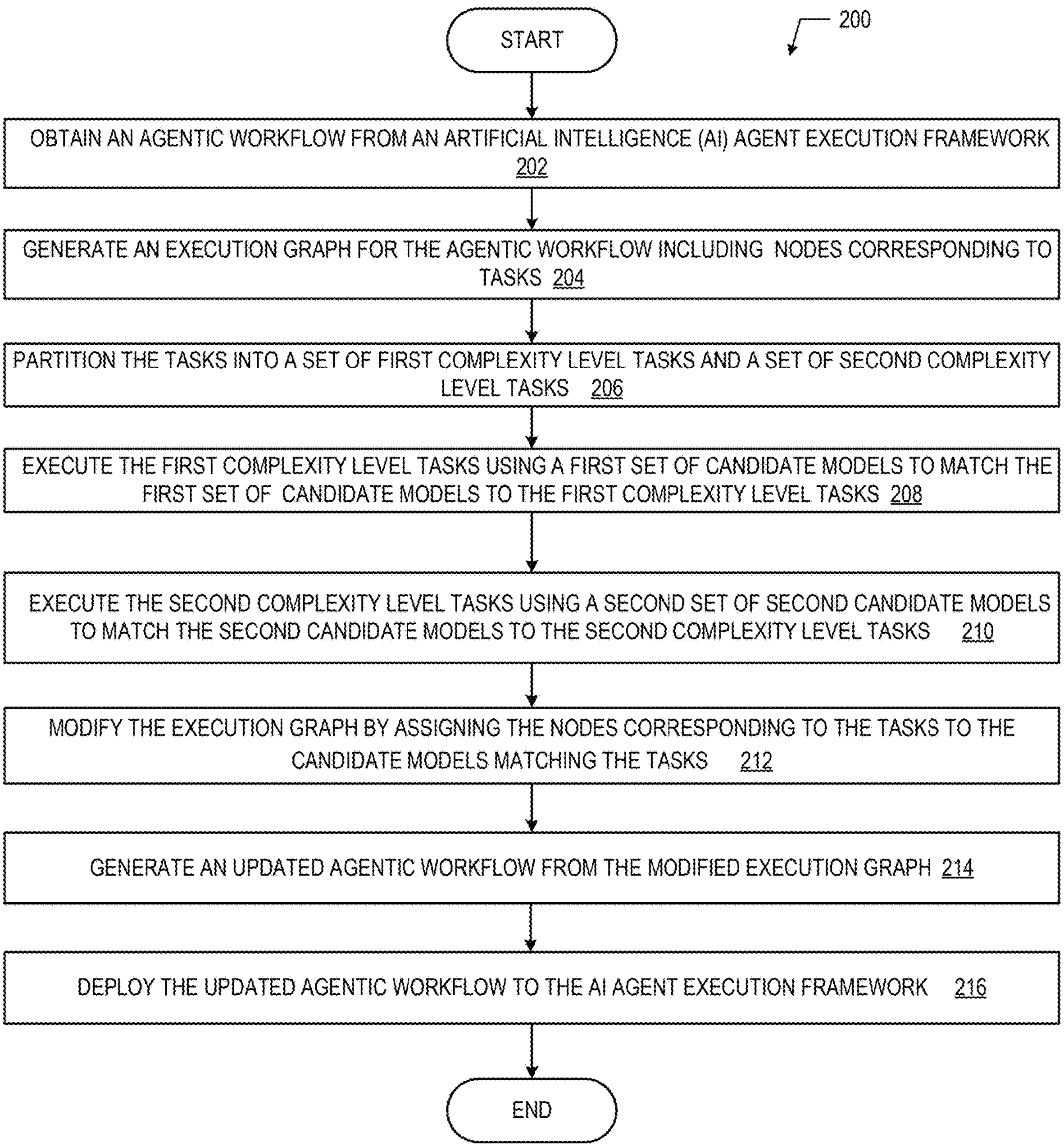
FIG. 2 shows a flowchart of a method, in accordance with one or more embodiments.

FIG. 2 shows a flowchart 200 of a method for optimizing an agentic workflow by assigning optimal LLMs to AI agents performing the tasks of the agentic workflow, in accordance with one or more embodiments. The method of FIG. 2 may be implemented using the system of FIG. 1 and one or more of the steps may be performed on or received at one or more computer processors. While the various steps in the flowchart 200 are presented and described sequentially, at least some of the steps may be executed in different orders, may be combined or omitted, and at least some of the steps may be executed in parallel. Furthermore, the steps may be performed actively or passively.

In Block 202, an agentic workflow is obtained from an AI agent execution framework. In one or more embodiments, the optimization tool may obtain the agentic workflow. The agentic workflow may be in a document format, such as a JSON document, or as a source code construct, such as a Python graph, or as source code in a programming language. The agentic workflow may further be stored in the data repository, on a physical storage device.

In Block 204, an execution graph is generated for the agentic workflow. The execution graph includes nodes, corresponding to tasks. In one or more embodiments, an LLM of the optimization tool may generate an execution graph for the agentic workflow. The execution graph may include a multitude of nodes. The multitude of nodes may correspond to a multitude of tasks. In one or more embodiments, the LLM may be the graph builder LLM of the optimization tool. The optimization tool may provide the LLM with a prompt, including the agentic workflow as an input. The prompt may further include an instruction to generate the execution graph. In one or more embodiments, the multitude of nodes may be agent nodes. The execution graph may further include tool nodes and edges interconnecting the agent nodes and the tool nodes. The graph builder LLM may generate the execution graph and store the execution graph in the data repository on the physical storage device.

In Block 206, the tasks are partitioned into a set of first complexity level tasks and a set of second complexity level tasks. In one or more embodiments, the first complexity level may refer to "complex" tasks, requiring deeper reasoning, synthesis, decision-making, or multi-step deliberation. In contrast, the second complexity level may refer to "simple" tasks, entailing routine reasoning, basic formatting, routing, or data retrieval. Thus, the tasks may be partitioned by complexity in this manner.

In Block 208, the first complexity level tasks are executed by the optimization tool, using a first set of candidate models, to match the first set of candidate models to the first complexity level tasks. The candidate models are LLMs that may be obtained from the LLM catalog. In one or more embodiments, a first set of candidate models may be executed to perform the set of first complexity level tasks. A goal of executing the first set of candidate models to perform the set of first complexity level tasks may be to assign a first candidate model to a first task of the set of first complexity level tasks. In one or more embodiments, executing the first set of candidate models may entail the optimization tool performing multiple operations. In one or more embodiments, the operations may include selecting the first candidate model from the first set of candidate models. A first test dataset corresponding to the first candidate model may be selected. The first candidate model may be triggered to process a first task of the set of first complexity level tasks using the first test dataset, to obtain performance metrics corresponding to the first tasks. In a similar manner, the first candidate model may be triggered to process the set of first complexity level tasks, using corresponding test datasets. A set of performance metrics for the first candidate model (LLM) may be obtained in this manner. The set of performance metrics further correspond to the set of first complexity level tasks. For example, if the tasks are {A, B, C, D}, then the set of performance metrics may be {$PM_a$, $PM_b$, $PM_c$, and $PM_d$}. These performance metrics may be generated by the first candidate model (LLM), $LLM_1$.

In one or more embodiments, a multitude of sets of performance metrics may be obtained. Continuing with the previous example, let three LLMs be executed as the candidate models of the first set of candidate models. Let the LLMs be $LLM_1$, $LLM_2$, and $LLM_3$. Then the set of performance metrics of the $LLM_1$ performing tasks {A, B, C, D} may be {$PM_{a1}$, $PM_{b1}$, $PM_{c1}$, and $PM_{d1}$}. For $LLM_2$, the performance metrics may be {$PM_{a2}$, $PM_{b2}$, $PM_{c2}$, and $PM_{d2}$}. Similarly, for $LLM_3$, the set of performance metrics may be {$PM_{a3}$, $PM_{b3}$, $PM_{c3}$, and $PM_{d3}$}. Thus, each candidate model of the first set of candidate models may execute the set of first complexity level tasks to obtain a multitude of sets of performance metrics. Each set of performance metrics of the multitude of sets of performance metrics is generated by a corresponding candidate model of the first set of candidate models.

Further, for the first task, corresponding performance metrics from the plurality of sets of performance metrics may be selected. The optimization function of Equation 1 may be applied to the corresponding performance metrics to obtain corresponding optimization function values. Continuing with the previous example, let the first task be task A. Then the corresponding performance metrics for task A are $PM_{a1}$, $PM_{a2}$, and $PM_{a3}$. Applying the optimization function of Equation 1, to the performance metrics, the optimization function values $OF_1$, $OF_2$, and $OF_3$ may be obtained. Notably, the performance metrics may include cost values, and latency values, as required by Equation 1. The weighting factors and minimum accuracy threshold may be obtained from configuration parameters for task A. Subsequently, a performance metric may be selected from the corresponding performance metrics based on a corresponding optimization function value satisfying a minimum accuracy threshold. A candidate model from the first set of candidate models that generated the performance metric may be obtained. The candidate model may further be assigned as the first candidate model. Continuing with the previous example, optimization function values $OF_1$ and $OF_2$, based on performance metrics $PM_{a1}$ and $PM_{a2}$ may satisfy the minimum accuracy threshold. However, $PM_{a1}$ may have a higher cost and $PM_{a2}$ may have a higher latency. In one or more embodiments, the performance metrics, optimization function values, and corresponding LLMs may be presented in the UI of the optimization tool. A user may select the LLM based on minimizing the cost, in one embodiment. In another embodiment, the LLM may be selected based on minimizing the latency. Thus, if the deciding factor is cost minimization, the LLM assigned to the first node may be $LLM_1$. On the other hand, if the deciding factor is latency minimization, then the LLM assigned to the first node may be $LLM_2$. In "assigning" an LLM to a node, the AI agent associated with the node may be configured to use the particular LLM.

In Block 210, the second complexity level tasks are executed, using a second set of candidate models, to match the second set of candidate models to the second complexity level tasks. In one or more embodiments, the steps of Block 210 may be similar to the steps of Block 208. More particularly, in one or more embodiments, a second set of candidate models may be executed to perform the set of second complexity level tasks. A goal of executing the second set of candidate models to perform the set of second complexity level tasks may be to assign a first candidate model to a first task of the set of first complexity level tasks. In one or more embodiments, a second test dataset corresponding to the second candidate model may be selected. The second candidate model may be triggered to process a second task of the set of second complexity level tasks using the second test dataset, to obtain performance metrics corresponding to the second tasks. In a similar manner, the second candidate model may be triggered to process the set of second complexity level tasks, using corresponding test datasets. A set of performance metrics for the second candidate model may be obtained in this manner. The set of performance metrics further corresponds to the set of second complexity level tasks. In one or more embodiments, a multitude of sets of performance metrics may be obtained. Each set of performance metrics of the multitude of sets of performance metrics is generated by a corresponding candidate model of the second set of candidate models.

Further, for the second task, corresponding performance metrics from the multitude of sets of performance metrics may be selected. The optimization function of Equation 1 may be applied to the corresponding performance metrics to obtain corresponding optimization function values. Subsequently, a performance metric may be selected from the corresponding performance metrics based on a corresponding optimization function value satisfying a minimum accuracy threshold. A candidate model from the second set of candidate models that generated the performance metric may be obtained. The candidate model may further be assigned as the second candidate model.

In Block 212, the execution graph is modified by assigning the nodes corresponding to the tasks to the candidate models matching the tasks. In one or more embodiments, the LLM of the optimization tool, more particularly, the graph builder LLM may modify the execution graph. Thus, the graph builder LLM, may assign a first node corresponding to the first task to the first candidate model, and a second node corresponding to the second task to the second candidate model in the execution graph, to generate a modified execution graph.

In Block 214, an updated agentic workflow is generated from the modified execution graph. In Block 216, the updated agentic workflow is deployed to the AI agent execution framework. In one or more embodiments, the AI agent execution framework, may traverse a modified execution graph. That is, the AI agent execution framework may cause the first candidate model assigned to the first node to execute the first task. Further, the AI agent execution framework, may select a subsequent task, based on a result obtained by executing the first task by the first candidate model. The AI agent execution framework may then cause a subsequent candidate model to execute the subsequent task. The subsequent candidate model may be (previously) assigned to the subsequent node corresponding to the subsequent task. Additionally, the first candidate model may execute a tool to perform at least a portion of the first task.

In one or more embodiments, the AI execution framework may be configured to perform multiple operations. The operations may include initiating traversal of the modified execution graph by the execution engine. The execution engine may cause the first candidate model assigned to the first node to perform the first task, to obtain a first task result. The execution state machine may then perform a transition from the first node of the modified execution graph to a subsequent node of the modified execution graph based on the first task result. Additionally, the execution state store may store execution state information of the modified execution graph. The execution engine may then cause a subsequent candidate model assigned to the subsequent node to execute the subsequent task.

Figure 3:
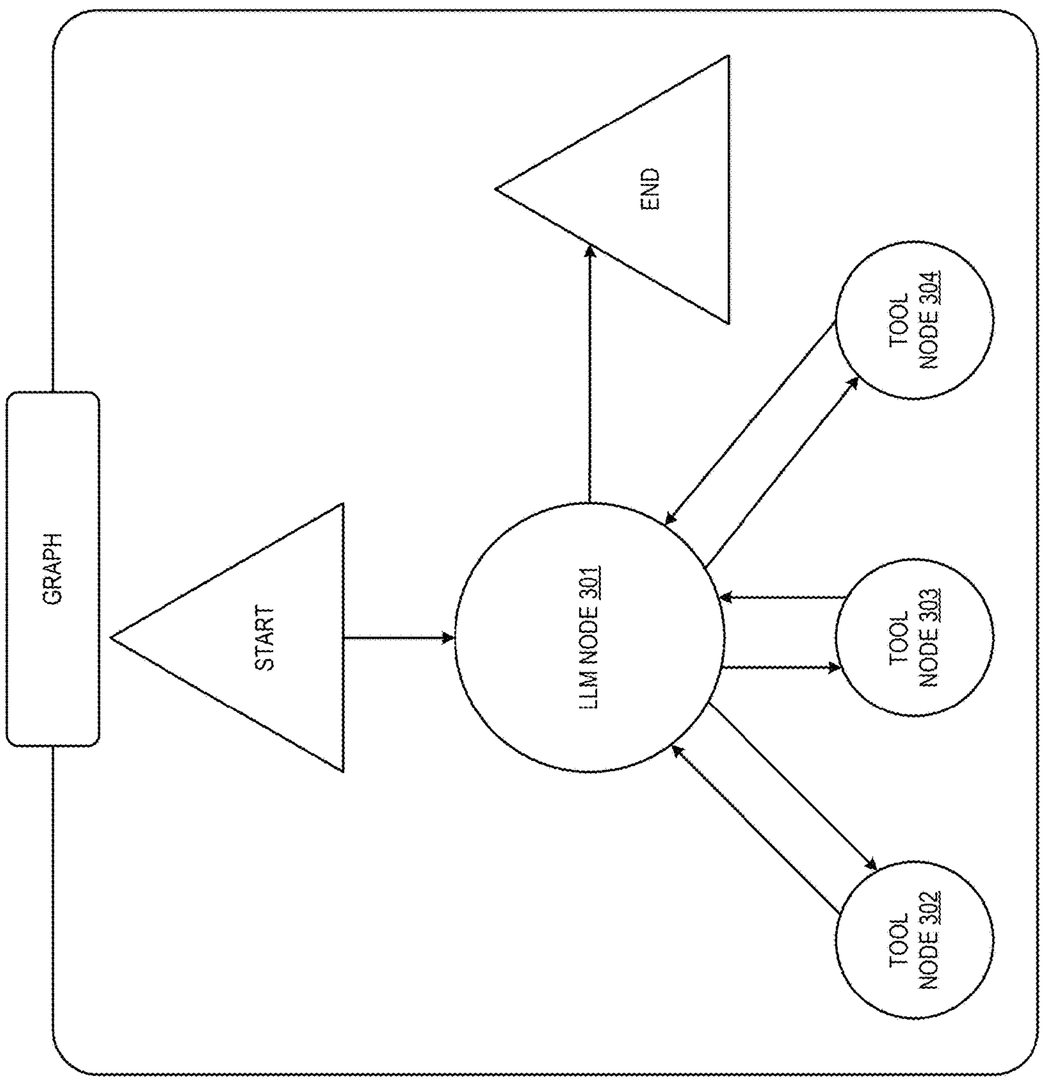
FIG. 3, FIG. 4, and FIG. 5 show examples, in accordance with one or more embodiments.
Figure 4:
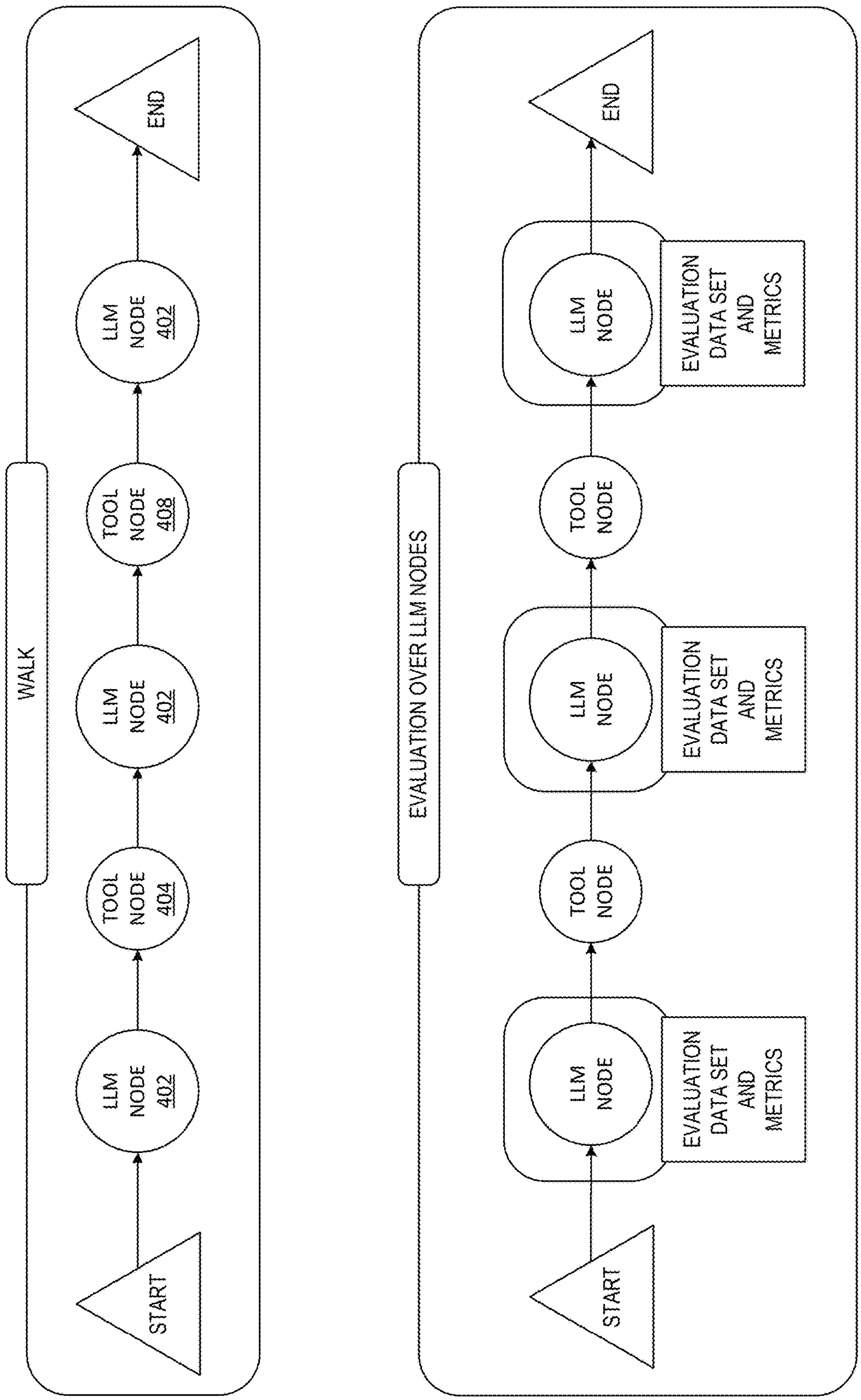
Figure 5:
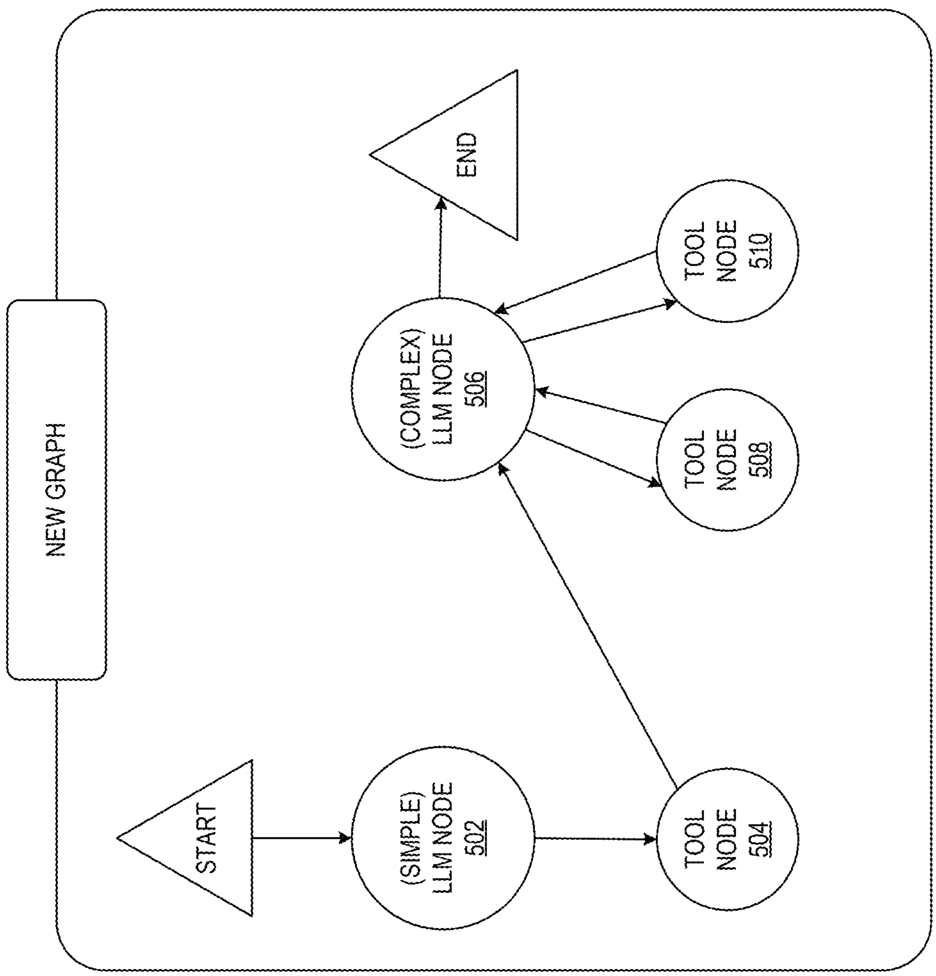

FIGS. 3, 4, and 5 show examples of an execution graph generated from an agentic workflow, graph traversal, and evaluation, in accordance with one or more embodiments. The following examples are for explanatory purposes only and not intended to limit the scope of one or more embodiments. The graph of FIG. 3 is an example of an "initial" execution graph obtained from an agentic workflow, as a candidate for optimization by the optimization tool. A user of the optimization tool may view the graph shown in FIG. 3. In the graph, a single "agent" node exists, shown as LLM Node (301). The agent LLM node (301) may invoke one or more tool nodes, shown as Blocks 302, 303, and 304. Each of the tool nodes is shown with an edge transitioning back to the LLM. The graph may be considered to show that a single LLM performs the tasks of the agentic workflow.

FIG. 4 further shows an example of a "walk" of the graph of FIG. 3. In the "walk" block, a visualization of the traversal of the graph embodying the agentic workflow is shown. Block 402, namely, the LLM, is used for a multitude of tasks, and may invoke various tools, shown by Blocks 404 and 408, to perform portions of the various tasks. In the "evaluation over LLM nodes," a visualization of configuring the LLMs to be evaluated as candidates for each LLM/agent node is shown.

FIG. 5 shows a modified graph "new graph." In contrast to the graph of FIG. 3, a new agent node is added to the graph, shown in Block 502. The result of evaluating candidate LLMs for the various tasks associated with the LLM nodes of FIG. 4 may cause the optimization tool to recommend that a simpler, faster, more cost effective LLM be assigned to the node in Block 502 to perform the associated task. The LLM may invoke the tool node shown in Block 504 to perform at least a portion of the associated task. The output of the tool may be received by another LLM, assigned to the node at Block 506. The LLM assigned to the node at Block 506 may be a large scale, higher cost LLM. The node at Block 506 may be associated with one or more complex tasks, entailing invoking tool nodes of Blocks 508 and 510.

Thus, the optimization tool dynamically selects the best combination of LLM assignments across the agentic graph, based on specific operational constraints. The optimization function evaluates multiple candidate configurations, balancing trade-offs between output quality, latency, and resource consumption. By solving the constrained optimization problem, the optimization tool automatically generates a tailored deployment plan that adapts the agentic flow to the real-world conditions in which it operates. The optimization tool ensures that the agentic flow not only remains modular and efficient by design, but also flexible and adaptive to varying performance demands.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 6A:
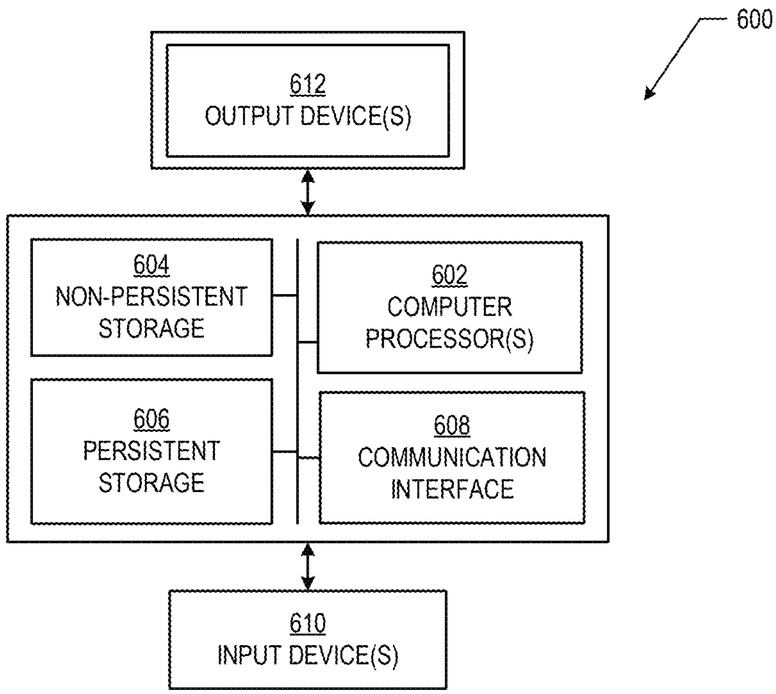
FIG. 6A and FIG. 6B show a computing system, in accordance with one or more embodiments.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores, or micro-cores, of a processor. The computer processor(s) (602) includes one or more processors. The computer processor(s) (602) may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments. The communication interface (608) may include an integrated circuit for connecting the computing system (600) to a network (not shown) (e.g., a local area network (LAN), a wide area network (WAN) such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input device(s) (610) and output device(s) (612) may be locally or remotely connected to the computer processor(s) (602). Many different types of computing systems exist, and the aforementioned input device(s) (610) and output device(s) (612) may take other forms. The output device(s) (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiving, presenting, and displaying data and messages described in the other figures of the disclosure.

Figure 6B:
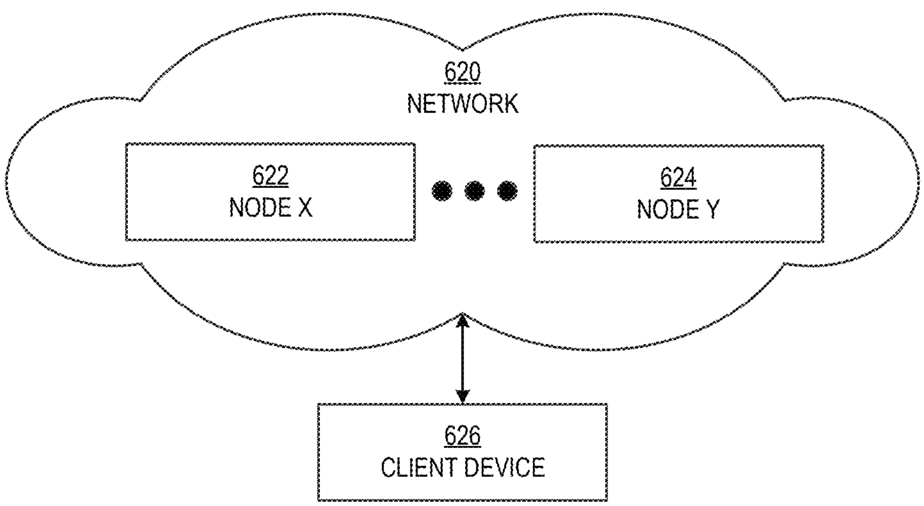

The computing system (600) in FIG. 6A may be connected to, or be a part of, a network. For example, as shown in FIG. 6B, the network (620) may include multiple nodes (e.g., node X (622) and node Y (624), as well as extant intervening nodes between node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626). The services may include receiving requests and transmitting responses to the client device (626). For example, the nodes may be part of a cloud computing system. The client device (626) may be a computing system, such as the computing system shown in FIG. 6A. Further, the client device (626) may include or perform all or a portion of one or more embodiments.

The computing system of FIG. 6A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term “connected to” contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms “before,” “after,” “single,” and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
obtaining an agentic workflow from an artificial intelligence (AI) agent execution framework;
generating, by a large language model (LLM), an execution graph for the agentic workflow, the execution graph comprising a plurality of nodes corresponding to a plurality of tasks;
partitioning the plurality of tasks by complexity to generate a set of first complexity level tasks and a set of second complexity level tasks;
executing a first set of candidate models to perform the set of first complexity level tasks to assign a first candidate model to a first task of the set of first complexity level tasks;
executing a second set of candidate models to perform the set of second complexity level tasks to assign a second candidate model to a second task of the set of second complexity level tasks;
assigning, by the LLM, a first node corresponding to the first task to the first candidate model, and a second node corresponding to the second task to the second candidate model in the execution graph, to generate a modified execution graph;
deploying an updated agentic workflow generated from the modified execution graph to the AI agent execution framework; and
traversing, by the AI agent execution framework, the modified execution graph, comprising:
causing, by the AI agent execution framework, the first candidate model assigned to the first node to execute the first task,
selecting, by the AI agent execution framework, a subsequent task, based on a result obtained by executing the first task by the first candidate model, and
causing, by the AI agent execution framework, a subsequent candidate model to execute the subsequent task, wherein the subsequent candidate model is assigned to a subsequent node corresponding to the subsequent task.

2. The method of claim 1, further comprising:
executing the first set of candidate models by performing operations comprising:
selecting the first candidate model from the first set of candidate models,
selecting a first test dataset corresponding to the first candidate model, and
processing, by the first candidate model, a first task of the set of first complexity level tasks, using the first test dataset, to obtain a set of performance metrics corresponding to the set of first complexity level tasks, wherein the set of performance metrics corresponds to the first candidate model.

3. The method of claim 1, further comprising:
executing, by each candidate model of the first set of candidate models, the set of first complexity level tasks to obtain a plurality of sets of performance metrics, wherein each set of performance metrics of the plurality of sets of performance metrics is generated by a corresponding candidate model of the first set of candidate models.

4. The method of claim 1, further comprising:
assigning the first candidate model to the first task of the set of first complexity level tasks by performing operations comprising:
obtaining a plurality of sets of performance metrics corresponding to the first set of candidate models,
selecting, for the first task, corresponding performance metrics from the plurality of sets of performance metrics,
applying an optimization function to the corresponding performance metrics to obtain corresponding optimization function values,
selecting a performance metric from the corresponding performance metrics based on a corresponding optimization function value satisfying a minimum accuracy threshold,
obtaining a candidate model from the first set of candidate models that generated the performance metric, and
assigning the candidate model as the first candidate model.

5. The method of claim 1, further comprising:
executing the second set of candidate models by performing operations comprising:
selecting the second candidate model from the second set of candidate models,
selecting a second test dataset corresponding to the second candidate model, and
processing, by the second candidate model, each task of the set of second complexity level tasks, to obtain a set of performance metrics corresponding to the set of second complexity level tasks, wherein the set of performance metrics corresponds to the second candidate model.

6. The method of claim 1, further comprising:
executing, by each candidate model of the second set of candidate models, the set of second complexity level tasks to obtain a plurality of sets of performance metrics, wherein each set of performance metrics of the plurality of sets of performance metrics is generated by a corresponding candidate model of the second set of candidate models.

7. The method of claim 1, further comprising:
assigning the second candidate model to the second task of the set of second complexity level tasks by performing operations comprising:
obtaining a plurality of sets of performance metrics corresponding to the second set of candidate models,
selecting, for the second task, corresponding performance metrics from the plurality of sets of performance metrics, applying an optimization function to the corresponding performance metrics to obtain corresponding optimization function values, selecting a performance metric from the corresponding performance metrics based on a corresponding optimization function value satisfying a minimum accuracy threshold, obtaining a candidate model from the second set of candidate models that generated the performance metric, and assigning the candidate model as the second candidate model.

8. The method of claim 1, wherein the first candidate model executes a tool to perform at least a portion of the first task.

9. A system, comprising:

at least one computer processor;

an artificial intelligence (AI) agent execution framework, executing on the at least one computer processor; and an optimization tool, executing on the at least one computer processor, and configured for:

obtaining an agentic workflow from the AI agent execution framework, generating, by a large language model (LLM) of the optimization tool, an execution graph for the agentic workflow, the execution graph comprising a plurality of nodes corresponding to a plurality of tasks, partitioning the plurality of tasks by complexity to generate a set of first complexity level tasks and a set of second complexity level tasks, executing a first set of candidate models to perform the set of first complexity level tasks, to assign a first candidate model to a first task of the set of first complexity level tasks, executing a second set of candidate models to perform the set of second complexity level tasks to assign a second candidate model to a second task of the set of second complexity level tasks, assigning, by the LLM of the optimization tool, a first node corresponding to the first task to the first candidate model, and a second node corresponding to the second task to the second candidate model in the execution graph, to generate a modified execution graph, deploying an updated agentic workflow generated from the modified execution graph to the AI agent execution framework, wherein the AI agent execution framework performs operations comprising:

traversing, by the AI agent execution framework, the modified execution graph, comprising:

causing the first candidate model assigned to the first node to execute the first task, selecting a subsequent task, based on a result obtained by executing the first task by the first candidate model, and causing a subsequent candidate model to execute the subsequent task, wherein the subsequent candidate model is assigned to a subsequent node corresponding to the subsequent task.

10. The system of claim 9, further configured for:

executing the first set of candidate models by performing operations comprising:

selecting the first candidate model from the first set of candidate models, selecting a first test dataset corresponding to the first candidate model, and processing, by the first candidate model, each task of the set of first complexity level tasks, to obtain a set of performance metrics corresponding to the set of first complexity level tasks, wherein the set of performance metrics corresponds to the first candidate model.

11. The system of claim 9, further configured for:

executing by each candidate model of the first set of candidate models, the set of first complexity level tasks to obtain a plurality of sets of performance metrics, wherein each set of performance metrics of the plurality of sets of performance metrics is generated by a corresponding candidate model of the first set of candidate models.

12. The system of claim 9, further configured for:

assigning the first candidate model to the first task of the set of first complexity level tasks by performing operations comprising:

obtaining a plurality of sets of performance metrics corresponding to the first set of candidate models, selecting, for the first task, corresponding performance metrics from the plurality of sets of performance metrics, applying an optimization function to the corresponding performance metrics to obtain corresponding optimization function values, selecting a performance metric from the corresponding performance metrics based on a corresponding optimization function value satisfying a minimum accuracy threshold, obtaining a candidate model from the first set of candidate models that generated the performance metric, and assigning the candidate model as the first candidate model.

13. The system of claim 9, further configured for:

executing the second set of candidate models by performing operations comprising:

selecting the second candidate model from the second set of candidate models, selecting a second test dataset corresponding to the second candidate model, and processing, by the second candidate model, each task of the set of second complexity level tasks, to obtain a set of performance metrics corresponding to the set of second complexity level tasks, wherein the set of performance metrics corresponds to the second candidate model.

14. The system of claim 9, further configured for:

executing, by each candidate model of the second set of candidate models, the set of second complexity level tasks to obtain a plurality of sets of performance metrics, wherein each set of performance metrics of the plurality of sets of performance metrics is generated by a corresponding candidate model of the second set of candidate models.

15. The system of claim 9, further configured for:

assigning the second candidate model to the second task of the set of second complexity level tasks by performing operations comprising:

obtaining a plurality of sets of performance metrics corresponding to the second set of candidate models, selecting, for the second task, corresponding performance metrics from the plurality of sets of performance metrics, applying an optimization function to the corresponding performance metrics to obtain corresponding optimization function values, selecting a performance metric from the corresponding performance metrics based on a corresponding optimization function value satisfying a minimum accuracy threshold, obtaining a candidate model from the second set of candidate models that generated the performance metric, and assigning the candidate model as the second candidate model.

16. A method, comprising:

generating, by an LLM, an execution graph of an agentic workflow, the execution graph comprising a plurality of nodes corresponding to a plurality of tasks;

partitioning the plurality of tasks by complexity to generate a set of first complexity level tasks and a set of second complexity level tasks;

executing by each candidate model of a first set of candidate models, the set of first complexity level tasks to obtain a first plurality of sets of performance metrics, wherein each set of performance metrics of the first plurality of sets of performance metrics is generated by a corresponding candidate model of the first set of candidate models;

selecting, for a first task of the first complexity level tasks, a first plurality of corresponding performance metrics from the first plurality of sets of performance metrics;

applying a first optimization function to the corresponding performance metrics to obtain a first plurality of corresponding optimization function values;

selecting a first performance metric from the corresponding performance metrics based on a first corresponding optimization function value satisfying a minimum accuracy threshold;

assigning a first candidate model from the first set of candidate models that generated the first performance metric;

executing by each candidate model of a second set of candidate models, the set of second complexity level tasks to obtain a second plurality of sets of performance metrics, wherein each set of performance metrics of the second plurality of sets of performance metrics is generated by the corresponding candidate model of the second set of candidate models;

selecting, for a second task of the set of second complexity level tasks, a second plurality of corresponding performance metrics from the second plurality of sets of performance metrics;

applying a second optimization function to the second plurality of corresponding performance metrics to obtain a second plurality of corresponding optimization function values;

selecting a second performance metric from the second plurality of corresponding performance metrics based on a second corresponding optimization function value satisfying the minimum accuracy threshold;

assigning a second candidate model from the second set of candidate models that generated the second performance metric;

assigning, by the LLM, a first node corresponding to the first task to the first candidate model, and a second node corresponding to the second task to the second candidate model in the execution graph, to generate a modified execution graph; and deploying an updated agentic workflow generated from the modified execution graph to an AI agent execution framework, wherein the AI agent execution framework performs operations comprising:

traversing, by the AI agent execution framework, the modified execution graph, comprising:

causing, by the AI agent execution framework, the first candidate model assigned to the first node to execute the first task, selecting, by the AI agent execution framework, a subsequent task, based on a result obtained by executing the first task by the first candidate model, and causing, by the AI agent execution framework, a subsequent candidate model to execute the subsequent task, wherein the subsequent candidate model is assigned to a subsequent node corresponding to the subsequent task.

* * * * *